Sept. 14, 1954 — E. W. BRUNE — 2,688,817
MINNOW TRAP
Filed Sept. 27, 1949
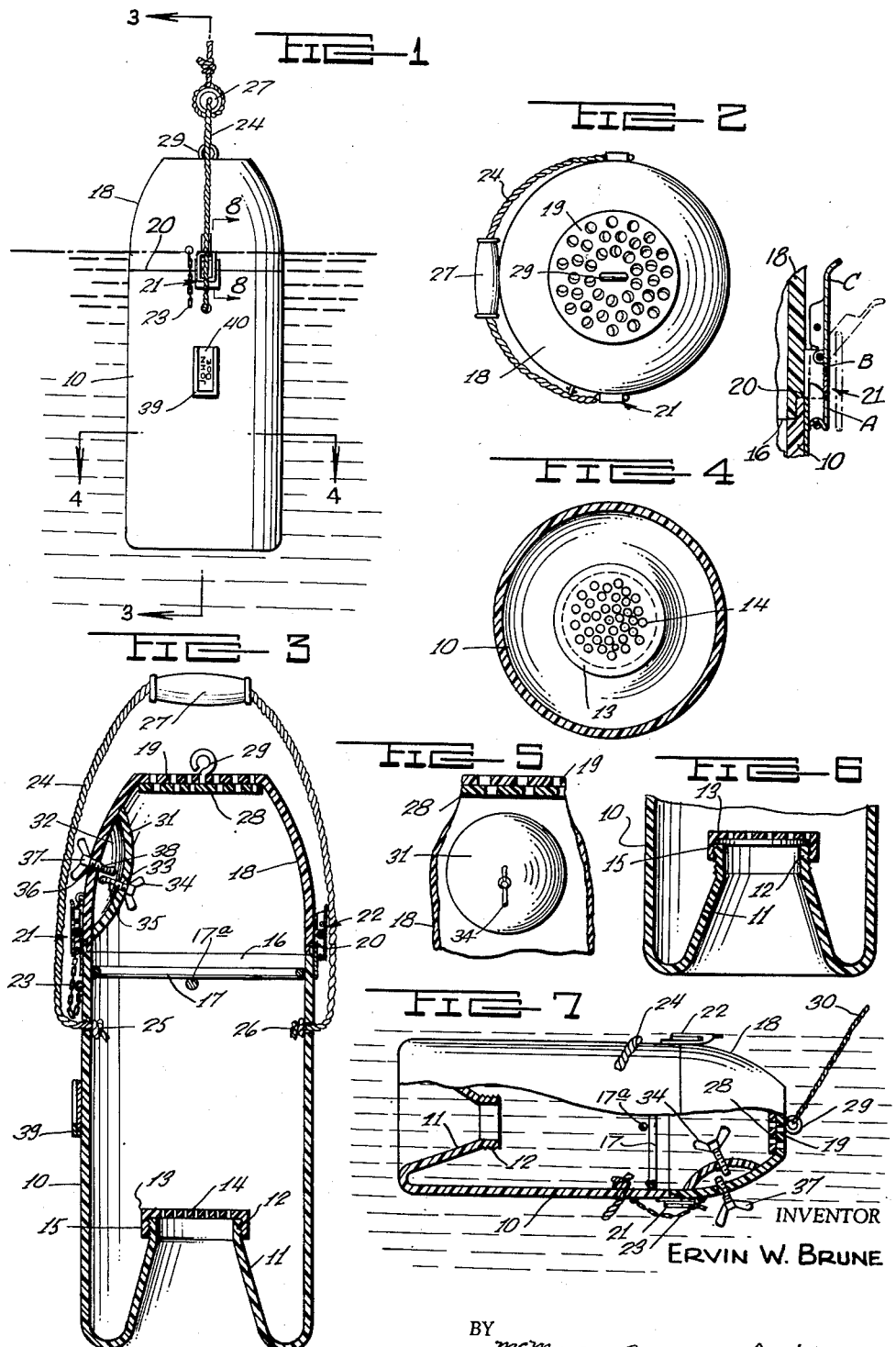
INVENTOR
ERVIN W. BRUNE
BY
McMorrow, Berman & Davidson
ATTORNEYS Patented Sept. 14, 1954

2,688,817

UNITED STATES PATENT OFFICE 2,688,817

MINNOW TRAP

Ervin W. Brune, Washington, Mo.

Application September 27, 1949, Serial No. 118,047

2 Claims. (Cl. 43—56)

This invention relates to improvements in minnow traps, and more particularly to a minnow trap which can also be used as a live bait pail.

It is among the objects of the invention to provide a minnow trap which can be set in a stream to catch minnows for live bait and can then be used as a live bait pail to retain the minnows for use in fishing, which is equipped with adjustable means for controlling the flow of water therethrough and with a hollow pocket or receptacle which can be used as a float or as a water ballast to assist in properly positioning the trap in the water, which is easy to condition for use as a trap or a pail, which can be formed of a readily-available transparent or translucent material, such as a synthetic resin plastic, and which is simple and durable in construction, economical to manufacture, and neat and attractive in appearance.

Other objects and advantages will become apparent from a consideration of the following description and the appended claims in conjunction with the accompanying drawing, wherein:

Figure 1 is a side elevation of a minnow trap illustrative of the invention, showing the trap supported in water in operative position to serve as a live bait pail;

Figure 2 is an enlarged top plan view of the minnow trap illustrated in Figure 1;

Figure 3 is a longitudinal cross-section on an enlarged scale taken on the line 3—3 of Figure 1;

Figure 4 is a transverse cross-section on an enlarged scale taken on the line 4—4 of Figure 1;

Figure 5 is a cross-section of a fragmentary upper portion of the trap, showing a structural detail thereof;

Figure 6 is a cross-section of a fragmentary lower portion of the trap, showing a structural detail;

Figure 7 is a side elevation of the trap positioned in water to function as a minnow trap, a portion being broken away and shown in longitudinal cross-section to better illustrate the construction thereof; and Figure 8 is an enlarged fragmentary sectional view taken on the line 8—8 of Figure 1.

With continued reference to the drawing, the improved minnow trap comprises an elongated, hollow imperforate body 10, preferably of cylindrical shape and having a thin wall which is preferably formed of a moldable plastic material, such as a synthetic resin plastic, and which may be transparent or translucent, so that minnows and other live bait will more readily enter the trap. This body 10 has an open end and has at its opposite end axially an inwardly-directed, funnel-shaped end wall 11 provided with an apical opening surrounded by an externally screw-threaded, cylindrical neck 12. A screw-cap 13 having a perforated end wall 14 and an internally screw-threaded, annular flange 15 is threadable onto the neck 12 in covering relationship to the opening in the end wall 11 of the body 10. This cap is threaded onto the neck 12 of the bottom wall when the device is used as a live bait pail or container, as illustrated in Figures 1 and 3, to prevent the bait from escaping through the opening in the bottom wall of the main body of the device, but is removed when the device is used as a trap, as illustrated in Figure 7, so that the bait can pass through the funnel-shaped bottom wall 11 and the apical opening therein into the interior of the body 10 without obstruction.

At its end opposite the bottom wall 11 the body 10 is provided with an internal, annular recess, the inner end of which forms an internal, annular shoulder 16 in the body near the open end of the latter. Adjacent the shoulder, the body is provided with an internal cross brace extending transversely across the body at its open end and secured thereto, the brace embodying a pair of wires 17 and 17a arranged in crisscross relation.

The open end of the body 10 is covered by an axially outwardly-tapered end cap 18 having an open end and having at its opposite end a flat, perforated end wall 19. At its open end the cap 18 is provided with an external groove which forms an annular, external shoulder 20 complementary to the shoulder 16 formed in the body 10. The recessed portion of the cap 18 is telescopically received in the recessed portion of the body 10 at the open end of the latter, while the end of the cap rests against the body shoulder 16 and the end of the body rests against the cap shoulder 20.

Two fastening devices 21 and 22, such as are ordinarily used on articles of luggage, such as suitcases and hat boxes, are secured to the body and to the cap 18. Each of these fasteners has two parts, one of which indicated by the letter A is secured to the body and one of which indicated by the letter B is secured to the cap, and which may be manually interlocked by means of a lever indicated by the letter C to firmly secure the end cap 18 onto the body 10.

A small chain or other flexible strand 23 is connected at one end to the body 10 and at its opposite end to the end cap 18 to prevent accidental loss of the cap. The body 10 is provided with two diametrically-opposite openings adjacent the internal rib 17 and a flexible bail 24 has its opposite ends inserted through these openings, respectively, and knotted, as indicated at 25 and 26, to secure the ends of the bail to the body 10. The bail may be passed through a suitable handle 27 having a longitudinal bore therethrough and to provide greater convenience in carrying the device.

A circular, perforated plate 28 is disposed against the axially inward side of the perforated end wall 19 of the end cap and rotatably secured to the end wall 19 by an eye 29, the shank of which is rigidly connected to the plate 28 and the eye of which is disposed at the axially outward side of the end wall 19 opposite the plate 28, so that the plate 28 can be turned by turning the eye. The plate 28 can be turned or moved relative to the perforated end wall 19 in a manner to adjustably control the total area of the openings through the end wall 19 and thereby regulate the flow of water through the trap. The eye 29 is also used to attach a line 30 to the corresponding end of the trap when the device is being used to trap live bait.

A piece 31 of thin-walled material of concavo-convex shape is secured at its peripheral edge to the inner surface of the end cap 18 at one side of the latter to provide between itself and the side wall of the end cap a pocket 32. This pocket-forming piece 31 may be of the same substance as the cap 18 and the body 10, and is provided with a screw-threaded opening 33 into which is threaded a thumb screw 34 having a notch 35 in the shank thereof and so arranged that when the notch is brought into the opening 33, an aperture will be provided through the wall 31. The side wall of the cap 18 overlying the pocket 32 is provided with a screw-threaded aperture 36 and a thumb screw 37 having a notch 38 in the shank thereof is threaded into the aperture 36, and the notch 38 is so arranged that when it is brought into the opening 36, an aperture is provided through the side wall of the cap into the pocket. The two thumb screws 34 and 37 provide valve means which can be opened to fill the pocket 32 with water, or to empty water therefrom, and which can be closed to either retain the pocket full of water or to keep water out of the pocket when desired. When the device is used as a trap, as illustrated in Figure 7, the pocket 32 is filled with water so that it will act as a water ballast or weight to cause the trap to topple to a reclining position on the bottom of a stream along which minnows pass. When the device is used as a live bait pail, as illustrated in Figures 1 and 3, the pocket 32 is emptied of water and filled with air and serves as a float to assist in maintaining the device in the upright position in the water, indicated in Figure 1. A small, plastic card holder 39 is secured on the outer side of the body 10 to hold a name card 40 so that a fisherman can easily identify his minnow traps.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a combined minnow trap and pail, a hollow plain cylindrical imperforate body having an end wall including a reduced opening, said body being open at the end thereof opposite said end wall, a cap removably engaged on the open end of said body, said cap having an end wall having perforations through which water can flow while preventing passage of minnows therethrough, said cap having a side wall, and weight means on said side wall acting to topple said body into a reclining position so as to maintain the body in minnow-trapping position, said weight means and a portion of the sidewall of the cap refining a ballast chamber adapted to contain water, said ballast chamber having aperture means through which ballast water can enter or be drained from the chamber, and valve means closing said aperture means.

2. In a combined minnow trap and pail, a plain hollow cylindrical body having an open end and another end formed with a restricted opening, a cap secured on said open end of the body, said cap having a perforated end wall and an imperforate side wall, a concave plate engaged with the cap side wall and therewith defining a ballast chamber, said cap side wall and said concave plate having restricted openings, and valve means having portions extending through said restricted openings, said valve portions being adjustable to close or open the restricted openings so as to retain or permit the draining of water from or the entrance of water into said chamber to serve as ballast for holding said body in a reclining toppled position.

References Cited in the file of this patent

UNITED STATES PATENTS

| Number | Name | Date |
| --- | --- | --- |
| D. 46,993 | Getz | Feb. 23, 1915 |
| 166,164 | Vose | July 27, 1875 |
| 178,947 | Parker | June 20, 1876 |
| 340,564 | Elliott | Apr. 27, 1886 |
| 540,526 | Hemp | Sept. 5, 1893 |
| 633,229 | Clark | Sept. 19, 1899 |
| 686,669 | Cope | Nov. 12, 1901 |
| 938,161 | Messinger | Oct. 26, 1909 |
| 956,138 | McAleer | Apr. 26, 1910 |
| 975,939 | Edwards | Nov. 15, 1910 |
| 1,201,051 | Jack | Oct. 10, 1916 |
| 1,219,842 | Morgan | Mar. 20, 1917 |
| 1,470,842 | Hyams | Oct. 16, 1923 |
| 1,638,238 | Brautigam et al. | Aug. 9, 1927 |
| 1,934,815 | Parrott | Nov. 14, 1933 |
| 1,941,242 | Bechtel et al. | Dec. 26, 1933 |
| 2,255,134 | Thomas | Sept. 9, 1941 |
| 2,347,670 | Devine | May 2, 1944 |
| 2,415,692 | Huston | Feb. 11, 1947 |
| 2,490,507 | Brown | Dec. 6, 1949 |
| 2,522,017 | Bergman | Sept. 12, 1950 |